US010878492B2

(12) United States Patent
Blandford et al.

(10) Patent No.: US 10,878,492 B2
(45) Date of Patent: Dec. 29, 2020

(54) PROVIDING SEARCH-DIRECTED USER INTERFACE FOR ONLINE BANKING APPLICATIONS

(71) Applicant: Teachers Insurance and Annuity Association of America, New York, NY (US)

(72) Inventors: Scott M. Blandford, Hopewell, NJ (US); Robert A. Lindenberg, Newton, MA (US); Laura Shragowitz, Cambridge, MA (US); Charles Reitzel, Arlington, MA (US); Albert F. Cole, Jr., Windham, NH (US)

(73) Assignee: TEACHERS INSURANCE & ANNUITY ASSOCIATION OF AMERICA, New York, NY (US)

( * ) Notice: Subject to any disclaimer, the term of this patent is extended or adjusted under 35 U.S.C. 154(b) by 520 days.

(21) Appl. No.: 14/707,511

(22) Filed: May 8, 2015

(65) Prior Publication Data
US 2016/0328792 A1 Nov. 10, 2016

(51) Int. Cl.
*G06Q 40/02* (2012.01)
*G06F 16/248* (2019.01)
*G06F 16/242* (2019.01)

(52) U.S. Cl.
CPC ........... *G06Q 40/02* (2013.01); *G06F 16/243* (2019.01); *G06F 16/248* (2019.01)

(58) Field of Classification Search
CPC .... G06Q 40/02; G06Q 40/00; G06Q 30/0256; G06Q 40/06; G06F 17/30864; G06F 17/30554; G06F 17/30696; G06F 16/248; G06F 16/9024
See application file for complete search history.

(56) References Cited

U.S. PATENT DOCUMENTS

| 5,710,889 | A  | * | 1/1998  | Clark     | G06Q 20/10 235/379    |
| 7,437,686 | B1 | * | 10/2008 | Bernstein | G06F 3/0481 715/853   |
| 7,606,825 | B1 | * | 10/2009 | Pai       | G06F 16/00            |
| 7,779,004 | B1 | * | 8/2010  | Walsh     | G06F 16/9535 707/734  |
| 7,788,305 | B2 | * | 8/2010  | Martinsson| G06F 16/2228 707/829  |

(Continued)

Primary Examiner — Mohammad Z Shaikh
(74) Attorney, Agent, or Firm — Lowenstein Sandler LLP

(57) ABSTRACT

Systems and methods for providing a search-directed user interface for online banking applications. An example method may comprise: receiving, via a graphical user interface (GUI) session associated with an authenticated user, a search argument comprising a character string; executing, by a processing device, a search query by matching the character string to account data of one or more accounts that the authenticated user is authorized to access, the account data comprising a plurality of data items representing at least one of: financial product types, financial product identifiers, financial transaction types, financial transaction descriptions, financial transaction amounts, portfolio types, accounts, and aggregated financial indicators; and causing a data set produced by executing the search query to be visually represented via the GUI session.

19 Claims, 11 Drawing Sheets

(56) References Cited

U.S. PATENT DOCUMENTS

| | | | | |
|---|---|---|---|---|
| 7,934,157 B2* | 4/2011 | Kimura | G06F 3/1256 | 715/274 |
| 8,219,540 B2* | 7/2012 | Carter | G06F 16/367 | 707/706 |
| 8,495,487 B2* | 7/2013 | Jerome | G06Q 40/00 | 707/602 |
| 8,589,446 B2* | 11/2013 | Peterson | G06F 3/0481 | 707/797 |
| 8,869,030 B2* | 10/2014 | Gofer | G06F 8/74 | 715/713 |
| 2003/0088536 A1* | 5/2003 | Behnia | G06Q 40/02 | |
| 2003/0105771 A1* | 6/2003 | Tiefenbrun | G06F 16/168 | |
| 2003/0218640 A1* | 11/2003 | Noble-Thomas | G06F 16/248 | 715/853 |
| 2004/0054672 A1* | 3/2004 | Tsuchitani | G06F 16/951 | |
| 2005/0203918 A1* | 9/2005 | Holbrook | G06Q 40/04 | |
| 2006/0064434 A1* | 3/2006 | Gilbert | G06F 16/164 | |
| 2006/0069635 A1* | 3/2006 | Ram | G06Q 30/08 | 705/37 |
| 2006/0106847 A1* | 5/2006 | Eckardt, III | G06F 16/3323 | |
| 2006/0229963 A1* | 10/2006 | Creager | G06Q 40/00 | 705/35 |
| 2007/0192281 A1* | 8/2007 | Cradick | G06F 16/3328 | |
| 2009/0171950 A1* | 7/2009 | Lunenfeld | G06F 17/30864 | |
| 2009/0276373 A1* | 11/2009 | Rosenthal | G06Q 40/025 | 705/36 R |
| 2011/0208586 A1* | 8/2011 | Joa | G06Q 30/0201 | 705/14.53 |
| 2011/0246268 A1* | 10/2011 | Satyavolu | G06Q 30/02 | 705/14.4 |
| 2011/0258088 A1* | 10/2011 | Padala | G06Q 40/02 | 705/30 |
| 2013/0129218 A1* | 5/2013 | Barrett | G06Q 20/401 | 382/182 |
| 2014/0082468 A1* | 3/2014 | May | G06F 16/951 | 715/205 |
| 2015/0026053 A1* | 1/2015 | Calman | G06Q 20/108 | 705/42 |
| 2015/0032602 A1* | 1/2015 | Blackhurst | G06Q 40/02 | 705/39 |
| 2015/0088693 A1* | 3/2015 | Moore | G06Q 30/0627 | 705/26.61 |
| 2015/0100519 A1* | 4/2015 | Globe | G06Q 30/0631 | 705/36 R |
| 2015/0135101 A1* | 5/2015 | Ellis | G06F 17/30991 | 715/762 |
| 2015/0149432 A1* | 5/2015 | Hart | G06Q 40/00 | 707/708 |
| 2015/0161139 A1* | 6/2015 | Wang | G06F 17/3053 | 707/735 |
| 2015/0186863 A1* | 7/2015 | Schwalb | G06Q 20/24 | 705/44 |
| 2015/0186886 A1* | 7/2015 | Schwalb | G06Q 40/02 | 705/44 |
| 2016/0125036 A1* | 5/2016 | Hanson | G06Q 30/02 | 707/733 |
| 2016/0125043 A1* | 5/2016 | Shelkey | G06Q 30/02 | 707/722 |
| 2016/0205070 A1* | 7/2016 | Kothuvatiparambil | G06F 17/30876 | 726/28 |
| 2017/0132315 A1* | 5/2017 | Lisa | G06F 16/9535 | |

* cited by examiner

403

ACCOUNT INFO | PRODUCTS | ARTICLES | ADVICE & GUIDANCE | TRANSACTIONS | TOOLS | ADVANCE SEARCH

200A

Search  Retirement  210

About 63,300 results (0.31 seconds)

Are you also interested in: *Budgeting*, *Talking to an Advisor*, *More Links*

220 — Your Account Information

Your Retirement Accounts

Marie Smith  403(b) Plan
GSRA (TIAA M1234566) CREF (V5612899)

$45,887.63
AS OF 06/2014

Marie Smith Retirement Plan
RA (TIAA M1234566) CREF (V5612899)

Products

230

TIAA-CREF Retirement Plans Nam viverra ipsum non neque vulputate malesuada. Etiam ornare tincidunt pretium. Nulla lobortis velit enim, nec venenatis sem scelerisque et. Nam ultrices nisi felis Employer Sponsored Retirement Accounts: Defined Contributions / Retirement plans Luctus et ultrices posuere cubilia Curae; Proin sed elementum libero. Nam dui leo, lobortis ut odio vitae, lacinia ornare dui. Duis semper turpis ac libero sagittis, at bibendum dui tempus. Duis commodo justo ut neque interdum posuere.

Employer Sponsored Retirement Accounts: Supplemental Retirement Accounts Lorem ipsum dolor sit amet, consectetur adipiscing elit. Curabitur imperdiet tellus nec enim hendrerit tristique. Fusce vel ligula vel ligula bibendum accumsan. Maecenas ac pulvinar leo, non pharetra tortor. Vestibulum ante ipsum primis in faucibus orci

+ MORE PRODUCTS

Search  TIAA-CREF Lifecycle funds  240

About 63,300 results (0.31 seconds)

Your Account Information  242

Your TIAA-CREF Lifecycle Funds

| INVESTMENT | ASSET CLASS | UNITS/SHARES | PRICE | BALANCE |
|---|---|---|---|---|
| TIAA-CREF Lifecycle 2030 Fund - Institutional Class | Multi-Asset | 4,227.2204 | $11.1800 | $47,260.42 |

You have this investment in the following plans:
ABC ORGANIZATION DEFINED CONTRIBUTION PLAN  $27,260.42
XYZ UNIVERSITY ORP  $20,000.00

Your recent transactions: TIAA-CREF Lifecycle Funds

YOUR RECENT TRANSACTIONS

Increase contributions to: TIAA-CREF Lifecycle Funds  Amount: $XXX.xx  Start Date: 07/15/2014

Fund Detail: TIAA-CREF Lifecycle  244

TIAA-CREF Lifecycle 2030 Fund (Retirement) TCLNX

| Daily NAV | Day's Change | Portfolio Net Assets | Gross / Net Expense Ratio | Overall Morningstar Rating out of 183 FUNDS | 52 Week Range |
|---|---|---|---|---|---|
| $13.64 | ▲ 0.05 (0.37%) | $2.39B | 0.88% / 0.70% | ★★★★ | $12.14 - $13.64 |
| As of 04/30/2014 | | As of 04/30/2014 | | As of 04/30/2014 Based on risk adjusted returns | 07/30/2013  07/30/2014 |

FIG. 2C

200E

Financial Services

Search $1700    260

Financial Search 262

| ACCOUNT | INVESTMENT | TICKER | ASSET CLASS | # SHARES | SHARE VALUE | BALANCE |
|---|---|---|---|---|---|---|
| K8556884 | CREF Equity Index | QCEQRX | Equities | 13.7 | $124.67 | $1,710.52 |
| K8556884 | CREF Growth | QCGRRX | Equities | 17.7 | $96.46 | $1,710.53 |
| K8556884 | CREF Money Market | QCMMRX | Money Market | 74.7 | $22.91 | $1,710.53 |
| K8556884 | CREF Social Choice | QCSCRX | Multi-Asset | 10.6 | $160.79 | $1,710.53 |
| K8556884 | TIAA Real Estate | QREARX | Real Estate | 6.5 | $265.19 | $1,710.53 |

Secondary Results - Transaction 264

| ACCOUNT | TRANSACTION | EMPLOYEE CONTRIBUTION | DATE | AMOUNT |
|---|---|---|---|---|
| K8556884 | Transfer | $1,724.27 | Sep 8, 2014 | $1,724.27 |
| K8556884 | Transfer | $1,724.27 | Sep 8, 2014 | $1,724.27 |
| K8556884 | Transfer | $1,724.27 | Sep 8, 2014 | $1,724.27 |
| K8556884 | Transfer | $1,724.27 | Sep 8, 2014 | $1,724.27 |
| K8556884 | Transfer | $1,724.26 | Sep 8, 2014 | $1,724.26 |

Cref S

272 cref servicing cref small cref stock cref s in Transaction Details cref s in Transaction Summaries cref s in Investments cref s in Accounts TIAA-CREF Plan Servicing Fee

CREF Stock

CREF Growth

CREF Equity Index

CREF Money Market

CREF Global Equities

| ACCOUNT | LTD CONTRIBUTION | LAST CONTRIBUTION | VESTED BALANCE | BALANCE |
|---|---|---|---|---|
| ABC UNIVERSITY TAX DEFERRED SAVINGS PLAN — 282 | | | | |

| INVESTMENT | TICKER | ASSET CLASS | | | |
|---|---|---|---|---|---|
| CREF Stock | QCSTRX | Equities | Jun 1, 1990 | $10,217.14 | $10,217.14 |
| | | | UNITS/SHARES | PRICE | BALANCE |
| | | | 2.3 | $361.75 | $826.23 |

| XYZ UNIVERSITY VOLUNTARY TDA PLAN | | | $59,893.67 | Dec 30, 2002 | $937,119.77 | $937,119.77 |

| INVESTMENT | TICKER | ASSET CLASS | | | |
|---|---|---|---|---|---|
| CREF Stock | QCSTRX | Equities | | | |
| | | | UNITS/SHARES | PRICE | BALANCE |
| | | | 1,390.5 | $361.75 | $503,014.55 |

| TRANSACTION | DATE | EMPLOYEE | EMPLOYER | AMOUNT |
|---|---|---|---|---|
| TIAA-CREF Plan Servicing Fee | Nov 14, 2014 | ($781.61) | $0.00 | ($781.61) |
| TIAA-CREF Plan Servicing Fee | Nov 26, 2014 | ($773.68) | $0.00 | ($773.68) |
| TIAA-CREF Plan Servicing Fee | Nov 19, 2014 | ($777.48) | $0.00 | ($777.48) |
| TIAA-CREF Plan Servicing Fee | Nov 17, 2014 | ($779.74) | $0.00 | ($779.74) |
| 284A — Total | | ($3,112.51) | $0.00 | ($3,112.51) |

| 284B — Total | $59,893.67 | | $947,336.91 | $947,336.91 |

FIG. 2G

"CREF Stock"  ⌕  — 290

292 —

| ACCOUNT | INVESTMENT | TICKER | ASSET CLASS | UNITS/SHARES | PRICE | BALANCE |
|---|---|---|---|---|---|---|
| A6564098 | CREF Stock | QCSTRX | Equities | 2.3 | $361.75 | $826.23 |
| K6273672 | CREF Stock | QCSTRX | Equities | 1,390.5 | $361.75 | $503,014.55 |
| Total | | | | 1,392.8 | | $503,840.78 |

Secondary Results – Transaction

294 —

| ACCOUNT | TRANSACTION | DATE | EMPLOYEE | EMPLOYER | AMOUNT |
|---|---|---|---|---|---|
| — K6273672 | TIAA-CREF Plan Servicing Fee | Nov 14, 2014 | ($781.61) | $0.00 | ($781.61) |
| | INVESTMENT | TICKER | UNITS/SHARES | PRICE | AMOUNT |
| | CREF Stock | QCSTRX | -2.7 | $293.60 | ($781.61) |
| — K6273672 | TIAA-CREF Plan Servicing Fee | Nov 26, 2014 | ($773.68) | $0.00 | ($773.68) |
| | INVESTMENT | TICKER | UNITS/SHARES | PRICE | AMOUNT |
| | CREF Stock | QCSTRX | -2.6 | $292.43 | ($773.68) |
| — K6273672 | TIAA-CREF Plan Servicing Fee | Nov 19, 2014 | ($777.48) | $0.00 | ($777.48) |

PROVIDING SEARCH-DIRECTED USER INTERFACE FOR ONLINE BANKING APPLICATIONS

TECHNICAL FIELD

The present disclosure is generally related to distributed computer systems, and is more specifically related to providing a search-directed user interface for online banking applications.

BACKGROUND

A financial institution may provide an online banking application that may be employed by the account holders for performing various financial transactions and/or account management operations.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 2A-2H schematically illustrate examples of graphical user interface (GUI) screens employed for providing a search-directed user interface for online banking applications, in accordance with one or more aspects of the present disclosure;

DETAILED DESCRIPTION

Figure 1:
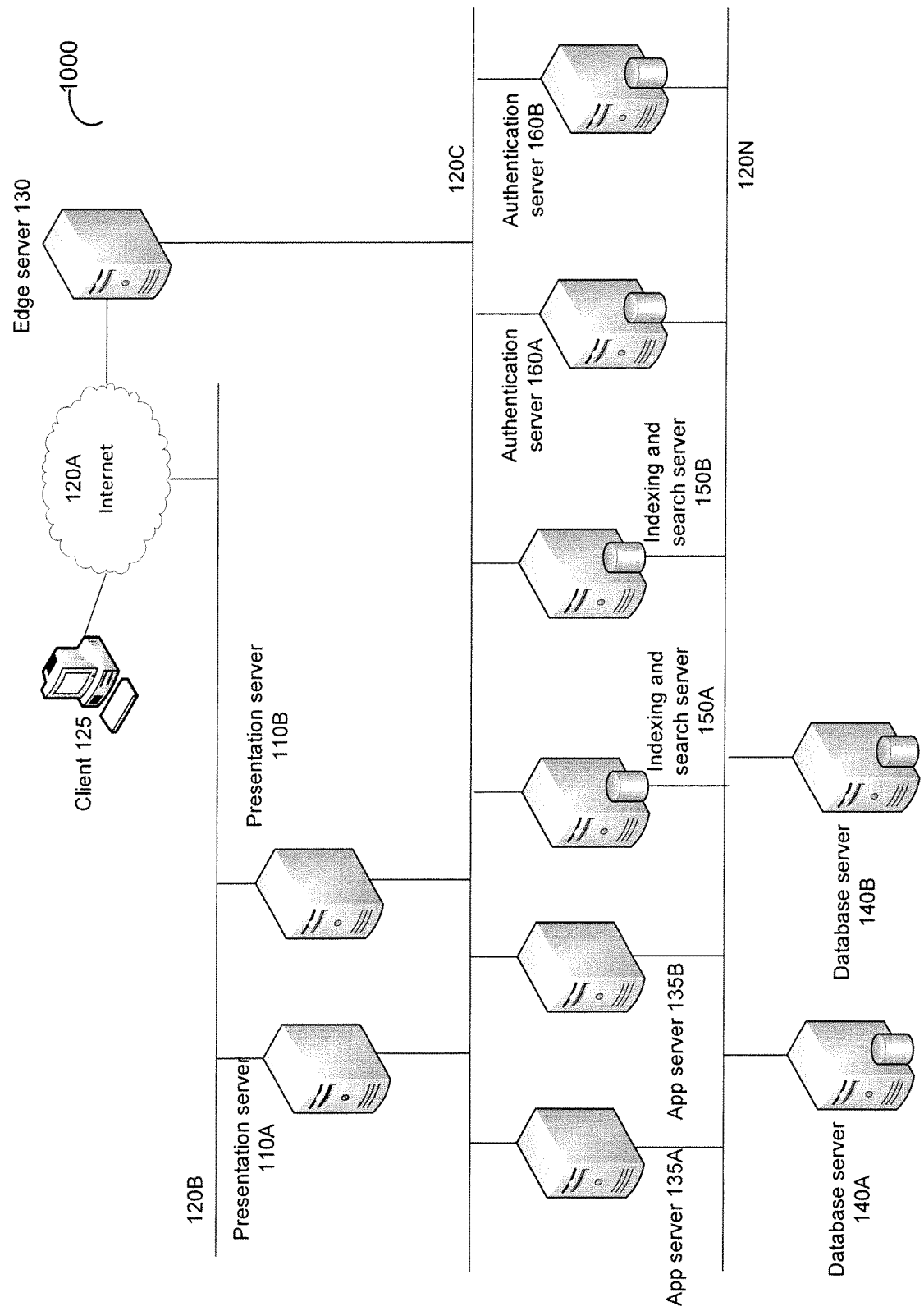
FIG. 1 schematically illustrates a high-level network diagram of an example distributed computer system that may implement the methods for providing a search-directed user interface for online banking applications, in accordance with one or more aspects of the present disclosure.

Described herein are methods and systems for providing a search-directed user interface for online banking applications.

"Online banking application" herein shall refer to a web application allowing an account holder or other authorized user to perform certain financial transactions and/or account management operations with respect to one or more financial accounts held by a certain financial institution. Examples of financial institutions include, but are not limited to, banks, building societies, credit unions, trust companies, mortgage loan companies, insurance companies, pension funds, investment banks, underwriters, brokerage firms, etc. Examples of financial accounts include, but are not limited to, checking accounts, savings accounts, loan accounts, revolving credit accounts, investment accounts, brokerage accounts, pension accounts, etc. Examples of financial transactions include, but are not limited to, account balance inquiry transactions, fund transfer transactions, security purchase transactions, etc. Examples of account management operations include, but are not limited to, opening accounts, closing accounts, designating an account beneficiary, etc.

In accordance with one or more aspects of the present disclosure, an online banking application may be implemented by a distributed computer system comprising one or more components, including, e.g., presentation servers, application servers, database servers, indexing and search servers, and/or various other components. References herein to presentation servers, application servers, database servers, indexing and search servers, and other components of example distributed computer systems are purely functional, as a single hardware system or a single software component may implement functions of one or more functional components that are described or referenced herein.

In various illustrative examples, a plurality of clients may access the online banking application via a network comprising one or more local area networks and/or one or more wide area networks (e.g., the Internet). A client request may trigger one or more chains of request-response interactions between numerous components of the distributed computer system.

One or more GUI screens (e.g., HTML frames) rendered by an online banking client may comprise certain GUI elements configured to receive character strings representing search arguments. Responsive to receiving one or more search arguments via a GUI associated with a session of an authenticated user, a presentation server may forward the search arguments to a search server for constructing and executing a search query.

Based on the specified search arguments, the search server may be configured to construct a search query to search the account data of one or more accounts that the user is authorized to access. In an illustrative example, such account data may comprise a plurality of data items representing financial product identifiers, financial transaction types, financial transaction descriptions, financial transaction amounts, financial instrument types, financial instrument descriptions, publicly traded security identifiers (e.g., ticker symbols), and/or aggregated financial indicators. In another illustrative example, the account data may further comprise miscellaneous account documents that may include, e.g., recorded communications between the account holder and the financial institution. In another illustrative example, the account data may further comprise recordings of account management actions that were performed by the account holder (e.g., account beneficiary designation, authorized user designation, recording of a power of attorney, etc.).

The resulting data set produced by executing the search query may comprise one or more account data records that include at least one data item matching the search arguments. In an illustrative example, the data set produced by executing the search query may comprise a data item (represented, e.g., by a financial product identifier, financial transaction type, financial transaction description) including a character string matching the search argument. In another illustrative example, the data set produced by executing the search query may comprise a data item represented by an account balance amount matching, within a certain accuracy range, an amount represented by the search argument. In another illustrative example, the data set produced by executing the search query may comprise a data item represented by a financial transaction amount matching, within a certain accuracy range, an amount represented by the search argument.

In certain implementations, the resulting data set produced by executing the search query may only comprise the data items that were created, updated, or modified within a pre-defined period of time. In an illustrative example, the resulting data set may comprise historic positions in one or more securities that, as of the current date, are no longer held by the account holder.

The resulting dataset produced by executing the search query may be returned to the presentation server for incorporating into one or more elements (e.g., HTML frames) to be rendered by the online banking client.

Various aspects of the methods and systems are described herein by way of examples, rather than by way of limitation. The methods described herein may be implemented by hardware (e.g., general purpose and/or specialized processing devices, and/or other devices and associated circuitry), software (e.g., instructions executable by a processing device), or a combination thereof.

FIG. 1 schematically illustrates a high-level network diagram of an example distributed computer system 1000, which may implement the methods for providing a search-directed user interface for online banking applications in accordance with one or more aspects of the present disclosure. Computer systems, components, appliances, and network segments are shown in FIG. 1 for illustrative purposes only and do not in any way limit the scope of the present disclosure. Various other computer systems, components, appliances, and/or methods of their interconnection may be compatible with the methods and systems described herein for providing a search-directed user interface for online banking applications.

Example distributed computer system 1000 may comprise various components, including, e.g., presentation servers 110A-110B, application servers 135A-135B, database servers 140A-140B, indexing and search servers 150A-150B, authentication servers 160A-160B, and/or various other components. Example distributed computer system 1000 may be configured to service requests initiated by a plurality of geographically distributed clients 125.

An application-level session may be initiated by a user of an online banking application having been successfully authenticated by an authentication server 160. A request initiated by client 125 may be routed, over one or more networks 120A-120N, to an edge server 130, which may then select, e.g., based on a load balancing scheme, a presentation server 110 to which the client request should be forwarded. In addition to performing the load balancing, edge servers 130 may serve static content in response to client HTTP requests, and/or perform various other tasks.

In an illustrative example, a plurality of edge servers 130 may be geographically distributed so that a request initiated by client 125 would be routed to an edge server 130, which is selected based on the client geographic location and/or other request parameters. The edge server 130 may then forward the client-initiated request to a dynamically selected presentation server 110. The latter may, upon parsing the request, issue one or more requests to one or more application servers 135A-135B configured to implement one or more online banking applications. An application server 135 may process a request received from a presentation server 110 and produce a response to be returned to the client 125. The request processing by application server 135 may comprise issuing one or more requests to one or more database servers 140A-140B. The presentation server 110 may then wrap the response produced by the application server 135 into one or more HTTP response messages and return the response messages to client 125 (e.g., via an edge server 130).

In accordance with one or more aspects of the invention, example distributed computer system 1000 may further comprise one or more indexing and search servers 150A-150B configured to index and search the account data stored, e.g., by one or more database servers 140A-140B.

The above described and other components of example distributed computer system 1000 may be interconnected by one or more networks 120A-120N, which may comprise one or more local area networks and/or one or more wide area networks. Firewalls, load balancers, network switches and various other networking components may be omitted from FIG. 1 for clarity.

One or more GUI screens (e.g., HTML frames) rendered by client 125 may comprise certain GUI elements configured to receive character strings representing search arguments. Responsive to receiving one or more search arguments via a GUI associated with a session of an authenticated user, a presentation server 110 may forward the search arguments to an indexing and search server 150 for constructing and executing a search query.

Based on the specified search arguments, indexing and search server 150 may construct a search query to search the account data of one or more accounts that the user is authorized to access. In an illustrative example, the account data may comprise a plurality of data items representing financial product identifiers, financial transaction types, financial transaction descriptions, financial transaction amounts, financial instrument types, financial instrument descriptions, publicly traded security identifiers (e.g., ticker symbols), and/or aggregated financial indicators.

"Financial product" herein shall refer to a service, which is provided by a financial institution to its clients. Examples of financial products include but are not limited to bank accounts, loan accounts, revolving credit accounts, investment accounts, brokerage accounts, pension accounts, account portfolios, etc.

Financial transaction types include, but are not limited to, account balance inquiry transactions, fund transfer transactions, security purchase transactions, etc.

Financial transaction description may include identifiers of one or more user accounts, an identifier of the transaction type, a date and time of the transaction, identifiers of one or more external entities associated with the transaction, one or more identifiers of the currencies of the transaction, one or more identifiers of the financial instruments associated with the transaction, one or more identifiers of the securities associated with the transaction, amount of the transaction, and/or a textual transaction description.

"Financial instrument" herein shall refer to a tradable asset (such as cash or an ownership interest in an entity) or a contractual right or obligation to receive or deliver a tradable asset.

"Aggregated financial indicators" herein shall refer to various aggregated statistics associated with the account data, e.g., the total amount of transactions of a certain type within a certain period, the total amount of interest earned by an account, the total amount of account administration fees, etc.

In another illustrative example, the account data may further comprise miscellaneous account documents that may include, e.g., recorded communications between the account holder and the financial institution. In another illustrative example, the account data may further comprise recordings of account management actions that were performed by the account holder (e.g., account beneficiary designation, authorized user designation, recording of a power of attorney, etc.).

The resulting data set produced by executing the search query may comprise one or more account data records that include at least one data item matching the search argument.

"Matching the search argument" herein shall include strict matching and fuzzy-logic matching (e.g., a data item produced by the search query would match the search argument if the data item comprises one or more search terms literally or if the data item comprises one or more terms that are synonymous to the search terms).

In an illustrative example, the data set produced by executing the search query may comprise a data item (represented, e.g., by a financial product identifier, financial transaction type, financial transaction description) including a character string matching the search argument. In another illustrative example, the data set produced by executing the search query may comprise a data item represented by a financial transaction amount matching, within a certain accuracy range, an amount represented by the search argument.

In certain implementations, the search query may be further executed against the data that is related to the search terms but is not comprised of the user account data (e.g., various informational articles, product descriptions, statistical data, publicly traded securities data, etc.).

In certain implementations, the resulting data set produced by executing the search query may only comprise the data items that were created, updated, or modified within a pre-defined period of time. In an illustrative example, the resulting data set may comprise historic positions in one or more securities that, as of the current date, are no longer held by the account holder.

The resulting dataset produced by executing the search query may be returned to the presentation server for incorporating into one or more elements (e.g., HTML frames) to be rendered by the online banking client, as described in more details herein below with references to FIGS. 2A-2H. In an illustrative example, the visual representation may be organized by type of the search results, such as by portfolio type, by financial product type, by account type or number, by transaction type, and/or by other attributes. In another illustrative example, the presentation server may further provide a "tree view" to organize the search results in groups (e.g., to group transactions of a certain type by the investment or account to which they apply). In yet another illustrative example, the presentation server may further provide summation and other statistics about the results of the search grouped by type, so that the statistics are meaningful.

The above described architecture of example distributed computer system 1000 serves as an illustrative example only and does not in any way limit the scope of the present disclosure. References herein to presentation servers, application servers, database servers, indexing and search servers, and other components of example distributed computer systems are purely functional, as a single hardware system or a single software component may implement functions of one or more functional components that are described or referenced herein. Various other system architectures may be compatible with the methods and systems for providing a search-directed user interface for online banking applications in accordance with one or more aspects of the present disclosure.

FIG. 2A schematically illustrates an example of data presentation GUI employed by example distributed computer system 1000 for providing a search-directed user interface for online banking applications, in accordance with one or more aspects of the present disclosure. Data presentation frame 200A comprises a search argument input field 210 and account information search result frame 220. In the illustrative example of FIG. 2A, the search term specified by the user is represented by the word "retirement," and the search result comprises account information of the user's retirement accounts. Information that is displayed for each account comprises the account description, one or more account identifiers (such as account numbers) and the account balance as of the current date.

FIG. 2B schematically illustrates another example of data presentation GUI employed by example distributed computer system 1000 for providing a search-directed user interface for online banking applications, in accordance with one or more aspects of the present disclosure. As noted herein above, a search query based on the user-specified search terms may be executed against both account data and non-account-specific data. The latter may comprise various informational articles, product descriptions, statistical data, and publicly traded securities data. Data presentation frame 200B illustrates an example search result comprising non-account-specific data 230 that includes descriptions of financial products being offered by the financial institution to its clients. In various illustrative examples, data presentation frames 200A and 200B may be rendered within a single visual frame that may be displayed within a single screen.

FIG. 2C schematically illustrates yet another example of data presentation GUI employed by example distributed computer system 1000 for providing a search-directed user interface for online banking applications, in accordance with one or more aspects of the present disclosure. Data presentation frame 200C comprises a search argument input field 240 and the search result frames comprising an account information frame 242 and a publicly traded security information frame 244. In the illustrative example of FIG. 2C, the search term specified by the user is represented by the string "TIAA-CREF lifecycle funds." The corresponding search result comprises the account information of the user's accounts that have one or more data items associated with the account (e.g., investment account position identifiers represented by publicly traded security identifiers) matching the search argument string. The search result further comprises the publicly traded security information of a publicly traded security that has one or more data items matching the search argument string. The information that is displayed within account information frame 242 for each account comprises the account description, one or more account identifiers (such as account numbers) and one or more account data items matching the search argument string. The information that is displayed within security information frame 244 for each publicly traded security comprises the security description, one or more security identifiers (such as ticker symbol and full security name) and one or more data items matching the search argument string.

Figure 2D:
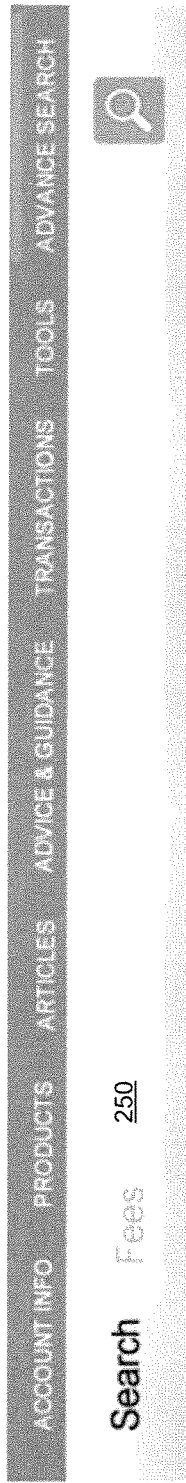

FIG. 2D schematically illustrates yet another example of data presentation GUI employed by example distributed computer system 1000 for providing a search-directed user interface for online banking applications, in accordance with one or more aspects of the present disclosure. Data presentation frame 200D comprises a search argument input field 250 and the search result frames comprising an account information frame 252 and a non-account-specific data frame 254. In the illustrative example of FIG. 2D, the search term specified by the user is represented by the string "fees." The corresponding search results comprise account information of the user's accounts that have the search argument string within one or more data items associated with the account (e.g., transaction description fields), as well as non-account-specific data (informational articles, product descriptions, statistical data, publicly traded securities data) that has the search argument string matching one or more data items. In the illustrative example of FIG. 2D, the information that is displayed within account information frame 252 for each account comprises the account description, one or more account identifiers (such as account numbers) and one or more account data items matching the search argument string. The information that is displayed within non-account-specific information frame 254 for non-account-specific data comprises "advice and guidance" articles that comprise one or more keywords matching the search argument string.

FIG. 2E schematically illustrates yet another example of data presentation GUI employed by example distributed computer system 1000 for providing a search-directed user interface for online banking applications, in accordance with one or more aspects of the present disclosure. Data presentation frame 200E comprises a search argument input field 260 and the search result frames comprising an account information frame 262 and a transaction information frame 264. In the illustrative example of FIG. 2E, the search term specified by the user is represented by the string "$1700." The corresponding search results comprise account information of the user's accounts that have the account balance matching, within a certain accuracy range, an amount represented by the search argument, as well as transaction information of the financial transactions that have the transaction amount matching, within a certain accuracy range, an amount represented by the search argument. The accuracy range may be specified by the user or may be automatically set (e.g., as being inversely proportional to the size of the search argument in order to make results returned in the range seem intuitively correct).

Information that is displayed within account information frame 262 for each account comprises the account description, one or more account identifiers (such as account numbers) and one or more account data items matching the search argument string. Information that is displayed within transaction information frame 264 for each transaction comprises the account identifier, the transaction description, the transaction date, and the transaction amount.

Figure 2F:

FIG. 2F schematically illustrates yet another example of data presentation GUI employed by example distributed computer system 1000 for providing a search-directed user interface for online banking applications, in accordance with one or more aspects of the present disclosure. In certain implementations, as a search query is being entered by the user, the system may suggest likely search terms that complete the partially typed words. Suggestions may be classified by the type of result requested—e.g., investments or transactions; such suggestions are only made if there are relevant results for the query as specified by the suggestion. Data presentation frame 200F comprises a search argument input field 270 and a list of suggestions 272 of search terms that complete the partially typed words.

FIG. 2G schematically illustrates yet another example of data presentation GUI employed by example distributed computer system 1000 for providing a search-directed user interface for online banking applications, in accordance with one or more aspects of the present disclosure. Data presentation frame 200G comprises a "tree view" 282 to organize the search results by the investment or account to which they apply. Data presentation frame 200G further comprises statistic lines 284A-284B to provide by-type summation of certain search results.

FIG. 2H schematically illustrates yet another example of data presentation GUI employed by example distributed computer system 1000 for providing a search-directed user interface for online banking applications, in accordance with one or more aspects of the present disclosure. Data presentation frame 200H comprises a search argument input field 290 and the search result frames comprising an account information frame 292 and a transaction information frame 294. In the illustrative example of FIG. 2H, the search term specified by the user is represented by the string "CREF Stock." The corresponding search results comprise account information of the user's accounts that have the investment product matching the search argument, as well as transaction information of the financial transactions with respect to the investment products matching the search argument. Information that is displayed within account information frame 292 for each account comprises the account description, one or more account identifiers (such as account numbers) and one or more account data items matching the search argument string. Information that is displayed within transaction information frame 294 for each transaction comprises the account identifier, the transaction description, the transaction date, and the transaction amount.

The above described data presentation frames serve as illustrative examples only and do not in any way limit the scope of the present disclosure. Various other data presentation frames may be compatible with the methods and systems for providing a search-directed user interface for online banking applications.

Figure 3:
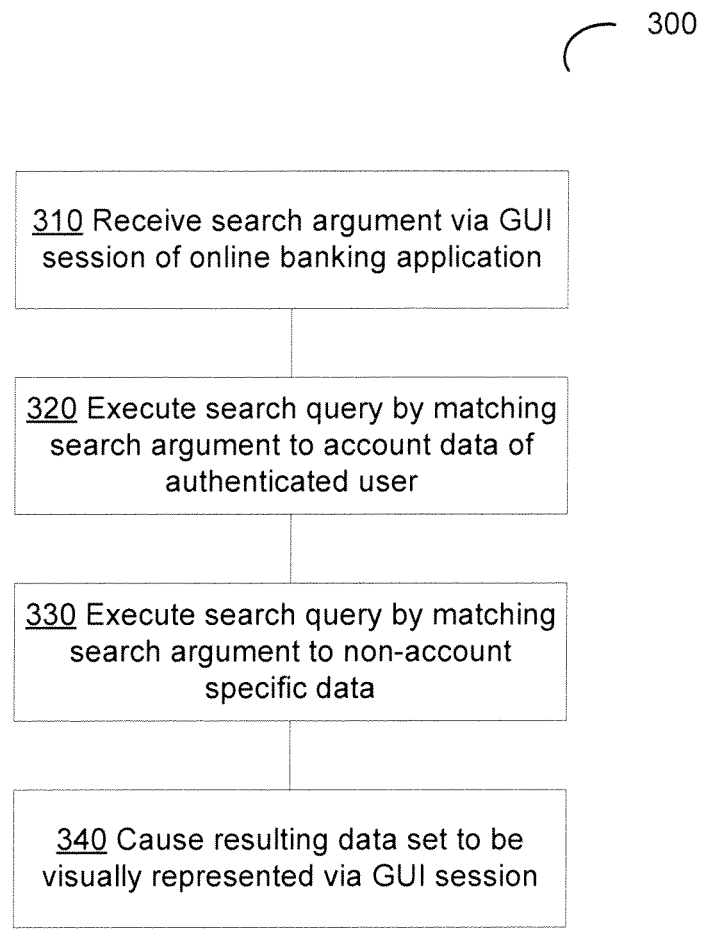
FIG. 3 depicts a flow diagram of an example method for providing a search-directed user interface for online banking applications, in accordance with one or more aspects of the present disclosure.

FIG. 3 depicts a flow diagram of an example method 300 for providing a search-directed user interface for online banking applications, in accordance with one or more aspects of the present disclosure. Method 300 and/or each of its individual functions, routines, subroutines, or operations may be performed by one or more general purpose and/or specialized processing devices. Two or more functions, routines, subroutines, or operations of method 300 may be performed in parallel or in an order that may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In an illustrative example, method 300 may be performed by an example computer system 500 described herein below with references to FIG. 4.

Referring to FIG. 3, at block 310, the processing device implementing the method may receive a search argument via a GUI session associated with an authenticated user of an online banking application, as described in more details herein above.

At block 320, the processing device may execute one or more search queries by matching the character string to account data of one or more accounts that the authenticated user is authorized to access. Such account data may comprise a plurality of data items representing financial product identifiers, financial transaction types, financial transaction descriptions, financial transaction amounts, financial instrument types, financial instrument descriptions, publicly traded security identifiers (e.g., ticker symbols), and/or aggregated financial indicators. The account data may further comprise recorded communications between the account holder and the financial institution, and/or recordings of account management actions that were performed by the account holder, as described in more details herein above.

At block 330, the processing device may execute one or more search queries by matching the character string to non-account-specific data. Such data may comprise various informational articles, product descriptions, statistical data, and publicly traded securities data, as described in more details herein above.

At block 340, the processing device may cause the resulting data set produced by executing the search query to be visually represented via the GUI session of the authenticated user, as described in more details herein above with references to FIGS. 2A-2H.

Figure 4:
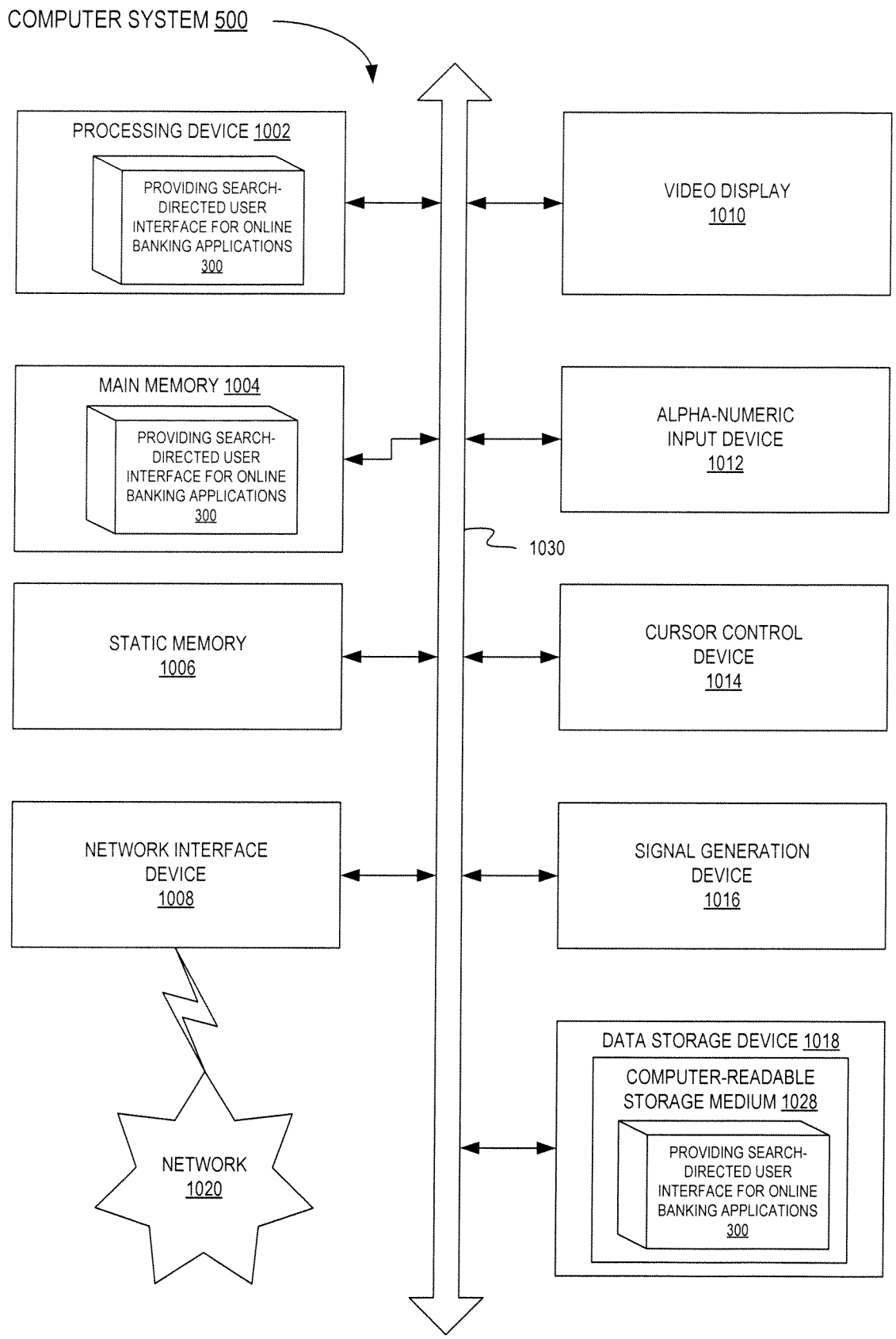
FIG. 4 depicts a block diagram of an illustrative computing device operating in accordance with one or more aspects of the present disclosure.

FIG. 4 illustrates a diagrammatic representation of a computer system 500 within which a set of instructions for causing the computing device to perform the methods discussed herein may be executed. The computer system 500 may be connected to other computing devices in a LAN, an intranet, an extranet, and/or the Internet. The computer system 500 may operate in the capacity of a server machine in client-server network environment. The computer system 500 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computer system" shall also be taken to include any collection of computing devices that individually or jointly execute a set (or multiple sets) of instructions to perform the methods discussed herein. In illustrative examples, the computer system 500 may implement the above described method 300 for providing a search-directed user interface for online banking applications.

The example computer system 500 may include a processing device (e.g., a general purpose processor) 1002, a main memory 1004 (e.g., synchronous dynamic random access memory (DRAM), read-only memory (ROM)), and a static memory 1006 (e.g., flash memory and a data storage device 1018), which may communicate with each other via a bus 1030.

The processing device 1002 may be provided by one or more general-purpose processing devices such as a microprocessor, central processing unit, or the like. In an illustrative example, the processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also comprise one or more special-purpose processing devices such as an application specific integrated circuit (ASIC), a field programmable gate array (FPGA), a digital signal processor (DSP), a network processor, or the like. The processing device 1002 may be configured to execute the method 300 for providing a search-directed user interface for online banking applications, in accordance with one or more aspects of the present disclosure.

The computer system 500 may further include a network interface device 1008, which may communicate with a network 1020. The computer system 500 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, video display unit 1010, alphanumeric input device 1012, and cursor control device 1014 may be combined into a single component or device (e.g., an LCD touch screen).

The data storage device 1018 may include a computer-readable storage medium 1028 on which may be stored one or more sets of instructions (e.g., instructions of the method 300 for providing a search-directed user interface for online banking applications, in accordance with one or more aspects of the present disclosure) implementing any one or more of the methods or functions described herein. Instructions implementing the method 300 may also reside, completely or at least partially, within main memory 1004 and/or within processing device 1002 during execution thereof by computer system 500, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
receiving, via a graphical user interface (GUI) session associated with an authenticated user, a search argument comprising a character string;
executing, by a processing device, a search query by matching an amount represented by the character string to account data pertaining to one or more accounts associated with the user, wherein the account data comprises a plurality of data items representing at least one of: financial product types, financial product identifiers, financial transaction types, financial transaction descriptions, financial transaction amounts, portfolio types, and aggregated financial indicators;

visually rendering, within a data presentation frame of the GUI session, an account information frame in a visual association with a transaction information frame, wherein the account information frame visually represents a first data set produced by executing the search query, wherein the first data set comprises a first data item extracted from the account data, the first data item identifying an account having a balance that matches, within an adjustable accuracy range that is automatically determined based on a size of the search argument, the amount represented by the search argument, and wherein the transaction information frame visually represents a tree view of a second data set produced by executing the search query, wherein the tree view groups transactions comprised by the second data set by their respective accounts, wherein the second data set comprises a second data item extracted from the account data, the second data item identifying a transaction having a transaction amount that matches, within the adjustable accuracy range, the amount represented by the search argument.

2. The method of claim 1, wherein the first data item comprises a financial product type associated with the account identified by the first data item.

3. The method of claim 1, wherein the first data item comprises a financial product identifier associated with the account identified by the first data item.

4. The method of claim 1, wherein the second data item comprises a financial transaction type associated with the transaction identified by the second data item.

5. The method of claim 1, wherein the second data item comprises a financial transaction description associated with the transaction identified by the second data item.

6. The method of claim 1, wherein the first data set only comprises data items that were created, updated, or modified within a pre-defined period of time.

7. The method of claim 1, wherein the account data further comprises communications between a holder of the accounts and a financial institution at which the accounts are held.

8. The method of claim 1, wherein the account data further comprises recordings of account management actions performed by a holder of the accounts.

9. The method of claim 1, wherein the account data further comprises descriptions of financial instruments associated with the accounts.

10. The method of claim 1, wherein the account data further comprises identifiers of publicly traded securities associated with the accounts.

11. The method of claim 1, wherein the account data further comprises historic positions in one or more securities that on a current date are no longer held by a holder of the accounts.

12. The method of claim 1, wherein executing the search query further comprises matching the character string representing the search argument to a plurality of data items representing information that is not comprised by the account data.

13. The method of claim 1, wherein the adjustable accuracy range is proportional to the size of the search argument.

14. A system comprising:
a memory; and
a processing device, coupled to the memory, wherein the processing device is configured to:

receive, via a graphical user interface (GUI) session associated with an authenticated user, a search argument comprising a character string;

execute a search query by matching an amount represented by the character string to account data pertaining to one or more accounts associated with the user, wherein the account data comprises a plurality of data items representing at least one of: financial product types, financial product identifiers, financial transaction types, financial transaction descriptions, financial transaction amounts, portfolio types, and aggregated financial indicators;

visually render, within a data presentation frame of the GUI session, an account information frame in a visual association with a transaction information frame, wherein the account information frame visually represents a first data set produced by executing the search query, wherein the first data set comprises a first data item extracted from the account data, the first data item identifying an account having a balance that matches, within an adjustable accuracy range that is automatically determined based on a size of the search argument, the amount represented by the search argument, and wherein the transaction information frame visually represents a tree view of a second data set produced by executing the search query, wherein the tree view groups transactions comprised by the second data set by their respective accounts, wherein the second data set comprises a second data item extracted from the account data, the second data item identifying a transaction having a transaction amount that matches, within the adjustable accuracy range, the amount represented by the search argument.

15. The system of claim 14, wherein the first data item comprises a financial product type associated with the account identified by the first data item.

16. The system of claim 14, wherein the first data item comprises a financial product identifier associated with the account identified by the first data item.

17. The system of claim 14, wherein the second data item comprises a financial transaction type associated with the transaction identified by the second data item.

18. The system of claim 14, wherein the second data item comprises a financial transaction description associated with the transaction identified by the second data item.

19. A computer-readable non-transitory storage medium comprising executable instructions that, when executed by a first computer system, cause the computer system to perform operations comprising:

receiving, via a graphical user interface (GUI) session associated with an authenticated user, a search argument comprising a character string;

executing a search query by matching an amount represented by the character string to account data pertaining to one or more accounts associated with the user, wherein the account data comprises a plurality of data items representing at least one of: financial product types, financial product identifiers, financial transaction types, financial transaction descriptions, financial transaction amounts, portfolio types, and aggregated financial indicators;

visually rendering, within a data presentation frame of the GUI session, an account information frame in a visual association with a transaction information frame, wherein the account information frame visually represents a first data set produced by executing the search query, wherein the first data set comprises a first data item extracted from the account data, the first data item identifying an account having a balance that matches, within an adjustable accuracy range that is proportional to a size of the search argument, the amount represented by the search argument, and wherein the transaction information frame visually represents a tree view of a second data set produced by executing the search query, wherein the tree view groups transactions comprised by the second data set by their respective accounts, wherein the second data set comprises a second data item extracted from the account data, the second data item identifying a transaction having a transaction amount that matches, within the adjustable accuracy range, the amount represented by the search argument.

* * * * *